UNITED STATES PATENT OFFICE.

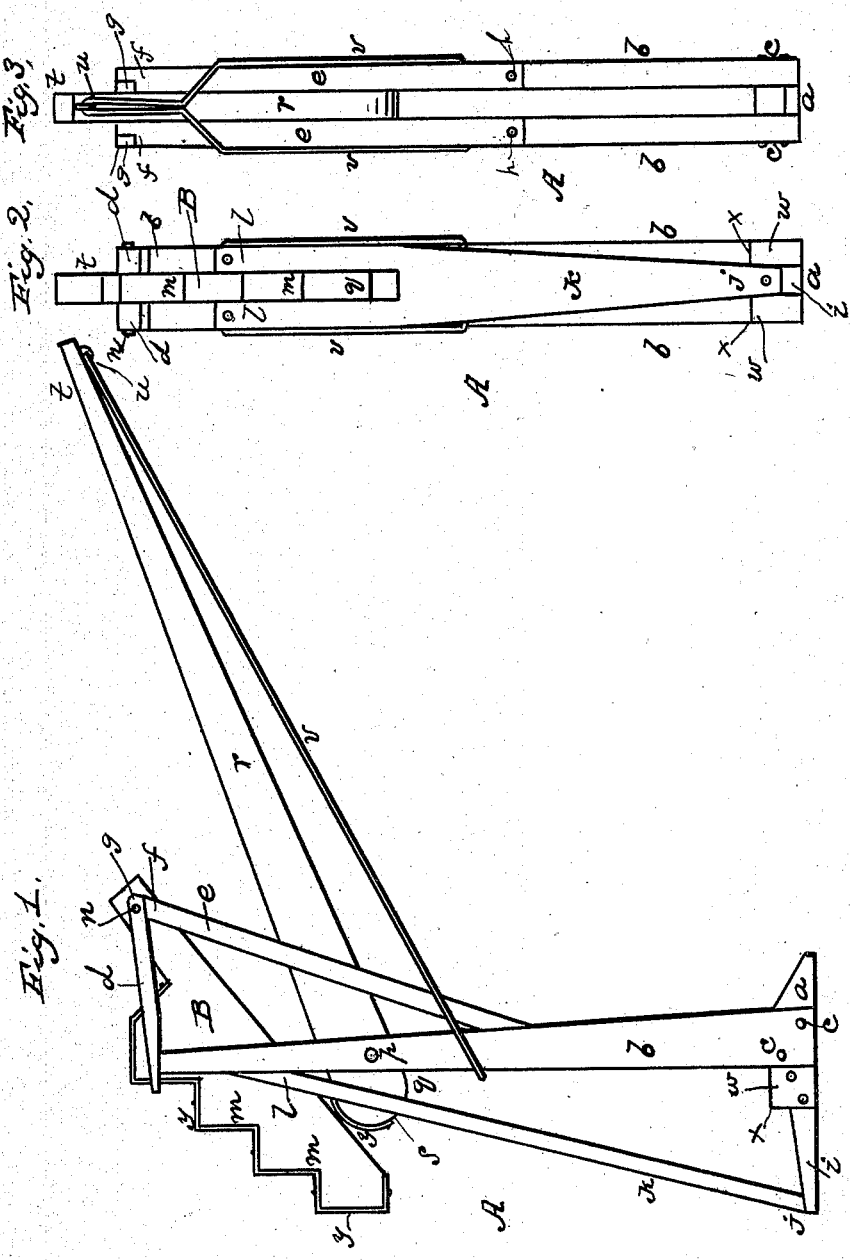

WILLIAM R. MOORE, OF EDEN, NEW YORK.

LIFTING-JACK.

SPECIFICATION forming part of Letters Patent No. 681,029, dated August 20, 1901.

Application filed April 17, 1899. Renewed May 29, 1901. Serial No. 62,361. (No model.)

*To all whom it may concern:*

Be it known that I, WILLIAM R. MOORE, a citizen of the United States, residing at Eden, in the county of Erie and State of New York, have invented certain new and useful Improvements in Lifting-Jacks; and I do hereby declare the following to be a full, clear, and exact description of the invention, such as will enable others skilled in the art to which it appertains to make and use the same.

My invention has relation to improvements in "lifting-jacks;" and it consists in the novel construction, combination, and arrangement of parts of which it is composed, all as will be hereinafter more fully explained, and particularly pointed out in the claim.

The annexed drawings, to which reference is had, fully illustrate my invention, in which—

Figure 1 represents a side view of my device. Fig. 2 is a front view of the same, and Fig. 3 is a rear view.

Referring by letter to the accompanying drawings, A designates the lifting-jack, composing the base-block $a$, which is secured between the two standards $b\ b$ by the bolts $c\ c$, and secured to the top of such standards are inclined bars $d\ d$, that are supported and braced by the inclined bars $e\ e$, the upper ends $f\ f$ being secured to the outer ends $g\ g$ of the bars $d\ d$, while their lower ends $h\ h$ are firmly fixed to the standards. To the extended end $i$ of the base-block is secured the lower end $j$ of an inclined bifurcated brace-bar $k$, the upper end $l$ of which is secured to the standard, each standard being provided with this brace-bar, thus providing a substantial standard for the weight to be lifted by the jack.

B designates an adjustable bar, which is notched, as at $m$, forming steps of different heights from the base-block, and the same is arranged between the upper ends of the pair of standards, the same being pivoted to the outer ends of the inclined brace-bars $e\ e$ by a bolt $n$, while the opposite end $o$ is free to move up and down. Beneath this pivoted stepped bar is pivoted, as at $p$, the inner end $q$ of a hand-lever $r$, the forward rounded end $s$ thereof engaging the under side of the pivoted arm or bar B, and to the outer end $t$ of the handle is pivoted one end $u$ of a wire loop $v$, the loop thereof passing around the front of the standard, and a block or plate $w$, having a sharp corner $x$, is secured to each side of the base for a purpose hereinafter explained. The steps, inner end of the lever, and the under side of the pivoted stepped bar may be protected from wear by applying sheet metal thereto, as shown at $y$ in Fig. 1.

Having thus described the various parts of which my lifting-jack is composed, I will now explain its operation.

In placing the jack beneath the axle of a vehicle the operator brings the step into play that is of a suitable height for the axle, after which he forces down the handle, the lever turning on its fulcrum, thereby causing the rounded end thereof to raise the stepped arm and with it the axle and vehicle. At the same time the looped end of the wire descends until the desired height for the axle is attained and the weight is upon the rounded end of the lever, when the loop will grip the standard and hold the lever and stepped arm in position. Upon releasing the jack from the weight the operator bears upon the handle of the lever and at the same time raises the loop, thus permitting the pivoted stepped arm to descend and disengage the axle. This operation can be accomplished with one hand only of the operator.

When it is desired to raise the stepped arm to an extended height, the lever is pressed down to or near its limit, when the loop will engage the corners of the two side plates $w\ w$ and hold the lever firmly in position, and in releasing the loop from said plates the same operation, as above described, for said releasing is performed.

A device as herein described is durable, simple in operation, and at the same time cheap to manufacture.

Having thus described my invention, what I claim, and desire to secure by Letters Patent, is—

In a lifting-jack, the combination with the standards $b$, $b$, provided with the base-block $a$, and plates $w$, $w$, secured to said base-block; of the bifurcated inclined bar $k$, the inclined bars $d$, $d$, and $e$, $e$, adjustable stepped bar B, located between the upper ends of the standards $b, b$, and pivotally secured to the bars $e, e$, and provided with the sheathing as at $y$, the hand-lever $r$, having its contacting end pivotally secured to, and between the standards $b, b$, and sheathing secured to its contacting end to contact with the under side of the adjustable bar B, and the wire loop $v$, having one end secured to the free end of the lever $r$, and its opposite end embracing the standards $b, b$, all arranged for joint operation, substantially as shown and described.

In testimony whereof I affix my signature in presence of two witnesses.

WM. R. MOORE.

Witnesses:
FREDERICK S. WARD,
A. FRANK ROCKWELL.